(12) United States Patent
Kim et al.

(10) Patent No.: US 10,823,997 B2
(45) Date of Patent: Nov. 3, 2020

(54) DISPLAY DEVICE

(71) Applicant: LG Display Co., Ltd., Seoul (KR)

(72) Inventors: Geunuk Kim, Paju-si (KR); WonTae Kim, Paju-si (KR); JinHyeok Cho, Paju-si (KR); Jongseok Cha, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/706,430

(22) Filed: Dec. 6, 2019

(65) Prior Publication Data

US 2020/0192142 A1 Jun. 18, 2020

(30) Foreign Application Priority Data

Dec. 18, 2018 (KR) .......................... 10-2018-0164344

(51) Int. Cl.
*G02F 1/1333* (2006.01)
*G02F 1/1335* (2006.01)

(52) U.S. Cl.
CPC .. *G02F 1/133308* (2013.01); *G02F 1/133528* (2013.01); *G02F 2001/133331* (2013.01); *G02F 2201/50* (2013.01); *G02F 2202/28* (2013.01)

(58) Field of Classification Search
CPC ......... G02F 1/133308; G02F 1/133528; G02F 2202/28; G02F 2201/50; G02F 2001/133331
See application file for complete search history.

(56) References Cited

U.S. PATENT DOCUMENTS

2010/0315570 A1\* 12/2010 Mathew ................ G06F 1/1658
349/58
2020/0174319 A1\* 6/2020 Chang ............... G02F 1/133605

\* cited by examiner

*Primary Examiner* — Phu Vu
(74) *Attorney, Agent, or Firm* — Fenwick & West LLP

(57) ABSTRACT

A display device comprises: a backlight unit; a liquid crystal panel comprising a lower polarizer, an upper polarizer, and a first substrate and a second substrate; and a cover plate on the liquid crystal panel, wherein a camera hole passes through the backlight unit and up to the lower polarizer, an interference prevention hole is located at a position corresponding to the camera hole, and the camera hole is not in the first substrate and the second substrate. The display device has a hole with a uniform size, decreased processing cost, increased structural rigidity, and does not have thermal deformation, can prevent defects such as generation of air bubbles, bending deformation, and distortion of a light path due to the hole and the vacuum bonding while increasing the visible light transmittance and resolution of the camera, and improving the appearance quality of the display device.

12 Claims, 12 Drawing Sheets

DISPLAY DEVICE

CROSS-REFERENCE TO RELATED APPLICATIONS

This application claims priority to the Republic of Korea Patent Application No. 10-2018-0164344, filed on Dec. 18, 2018, the disclosure of which is incorporated by reference in its entirety.

BACKGROUND OF THE DISCLOSURE

Field of the Disclosure

The present disclosure relates to a display device, and more particularly, to a display device having a camera hole in a display.

Description of Related Art

As mobile devices such as smart phones, pads, and notebooks evolve, the demand for displays is gradually increasing. In recent years, it is moving toward a full-screen display that increases the sense of immersion and covers the front surface in order to benefit from the size and design of the mobile device.

For example, if only a camera hole is remained on the front surface of the display and the remainder is all hidden, it can be a simple shape. When the shape of the front surface of the display becomes simple, the non-screen region is reduced, such that the sense of immersion is enhanced when viewing the image, etc.

SUMMARY OF THE DISCLOSURE

An object of the present disclosure is to provide a display device, which can prevent the difficulty of drilling a hole in a uniform size, the processing cost is increased, the structural rigidity is reduced, the thermal deformation due to the laser should be considered, etc.

Further, the display device can prevent defects such as the bending deformation and the distortion of a light path due to the formation of a hole when a camera hole in a display is applied, thereby enhancing the quality.

The present disclosure discloses a display device, comprising: a backlight unit; a liquid crystal panel comprising a lower polarizer positioned on an upper surface of the backlight unit, an upper polarizer positioned on an upper surface of the lower polarizer, and a first substrate and a second substrate positioned between the lower polarizer and the upper polarizer; and a cover plate on an upper surface of the liquid crystal panel, wherein a camera hole passes through the backlight unit and up to the lower polarizer, an interference prevention hole is located at a position corresponding to the camera hole in the upper polarizer, and the camera hole is not formed in the first substrate and the second substrate.

In some embodiments, the display device further comprises a deformation prevention structure for preventing the deformation of the liquid crystal panel or the generation of air bubbles in the interference prevention hole.

The display device of the present disclosure includes polarizers that do not cover the camera lens, thereby increasing the resolution of the camera.

Further, the display device of the present disclosure prevents defects such as the generation of air bubbles, bending deformation, and distortion of a light path due to the formation of the hole and the vacuum bonding even while increasing the visible light transmittance and increasing the resolution of the camera, and improving the appearance quality of the display device.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

Figure 1:
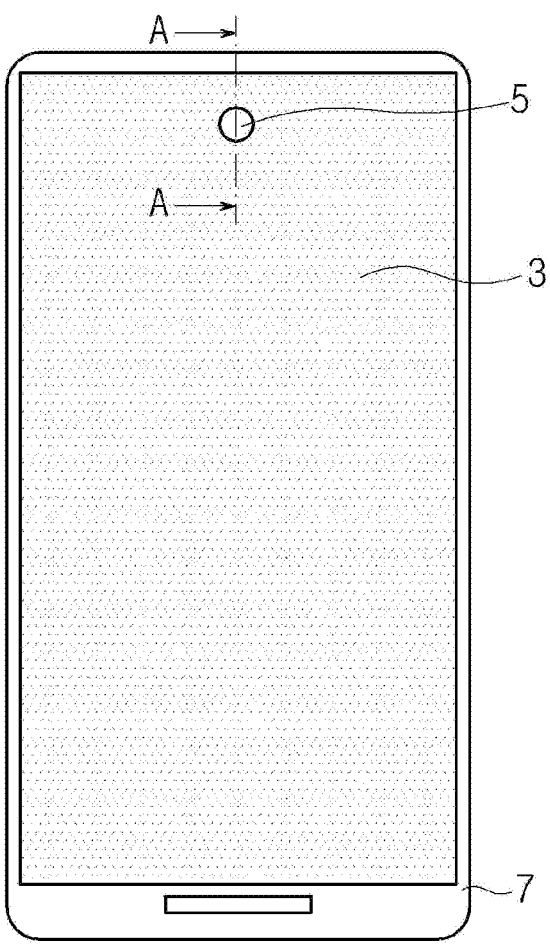
FIG. 1 is a front diagram illustrating a display device according to an embodiment of the present disclosure.

As illustrated in FIG. 1, a display device 1 of the present disclosure is a hole-in-display type having a camera hole 5 in a display unit 3. When the camera hole 5 is provided in the display unit 3, a bezel 7 corresponding to the edge surrounding the display unit 3 can become smaller, thereby implementing a simple design and enhancing the sense of immersion when viewing an image, etc.

The camera hole 5 can be provided in the center of the upper portion or one side of the upper portion of the display unit 3. Herein, the center of the upper portion or one side of the upper portion has been described based on the drawings. Then, since the direction and position indications used in the present specification are described based on the drawings, 'upper portion' can be described as 'upper surface' or 'front surface', and 'lower portion' can also be described as 'lower surface' or 'back surface' or 'rear surface', etc. according to the direction illustrated in the drawings.

Figure 2:
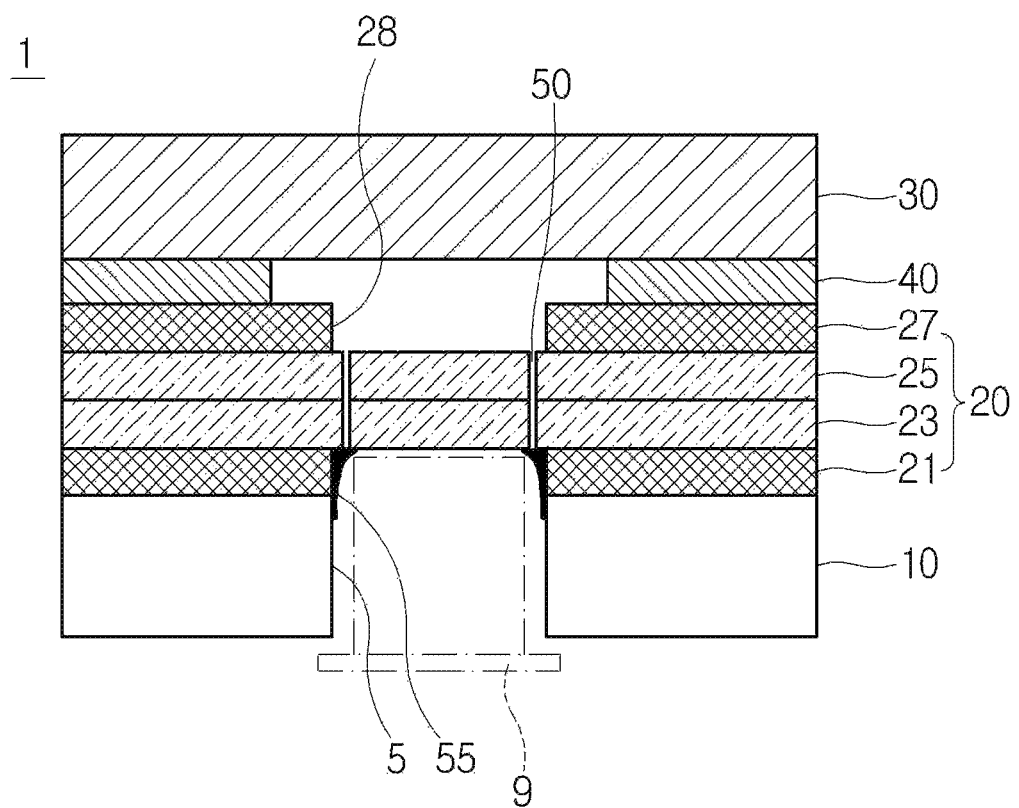
FIG. 2 is a cross-sectional diagram illustrating an embodiment of the portion A-A of FIG. 1.

As illustrated in FIG. 2, the display device 1 includes a backlight unit 10, a liquid crystal panel 20 installed on the upper portion of the backlight unit 10, and a cover plate 30 attached to the upper portion of the liquid crystal panel 20.

The backlight unit 10 uniformly supplies light to the liquid crystal panel 20 so that an image can be visually recognized from the display unit 3, and the liquid crystal panel 20 outputs the image through the light received from the backlight unit 10.

The liquid crystal panel 20 includes a lower polarizer POL 21, a first substrate 23, a second substrate CF 25, and an upper polarizer POL 27. The lower polarizer 21 is positioned on the upper portion of the backlight unit 10, and the first substrate 23, the liquid crystal layer (not illustrated), and the second substrate 25 are positioned between the lower polarizer 21 and the upper polarizer 27. The upper and lower positions of the first substrate 23 and the second substrate 25 can be changed with each other. Wherein, the first substrate 23 may be a TFT substrate, the second substrate may be a color filter substrate.

The lower polarizer 21 and the upper polarizer 27 control the polarization of the light emitted from the backlight unit 10 to control the amount of the transmitted light. The first substrate 23 turns on and off a voltage as a switching element. The liquid crystal layer controls the amount of the transmitted light emitted from the backlight unit 10 by an electric field of a pixel electrode and a common electrode controlled by the thin film transistor TFT of the first substrate 23. A common voltage entirely common to the display unit 3 is applied to the common electrode, and a voltage is individually applied to the pixel electrode through a data line necessary for each pixel electrode. In addition, the display unit 3 includes a plurality of sub-pixels. The plurality of sub-pixels can include a red sub-pixel, a green sub-pixel, a blue sub-pixel, and a white sub-pixel. In addition, each sub-pixel includes the second substrate 25 for a color control of the light transmitted through the corresponding sub-pixel region. The second substrate 25 can include a red (R) color filter, a green (G) color filter, a blue (B) color filter, and a white (W) color filter. At this time, the white (W) color filter can be formed of a white color filter but also implemented by a method that does not include a separate color filter.

The light emitted from the backlight unit 10 passes through the lower polarizer 21, the first substrate 23 controls the voltage appropriately so that the liquid crystal layer controls the amount of the transmitted light, the light makes colors for the images while passing through the second substrate 25 via the liquid crystal layer, and the images (videos) are implemented by passing through the cover plate 30 via the upper polarizer 27.

In order to implement a hole-in-display type display, the camera hole 5 is formed by passing through the backlight unit 10 and the lower polarizer 21. A camera 9 is inserted into the camera hole 5 formed by passing through the backlight unit 10 and the lower polarizer 21.

The upper polarizer 27 is formed with an interference prevention hole 28 at a position corresponding to the camera hole 5.

The camera hole 5 can also be formed by passing through the backlight unit 10 and the liquid crystal panel 20, but in the present embodiment, the camera hole 5 can be formed by passing through the backlight unit 10 and the lower polarizer 21 in the liquid crystal panel 20.

When the camera hole 5 is formed by passing through the backlight unit 10 and the liquid crystal panel 20, only the cover plate 30 is positioned on the front surface of a camera lens of the camera 9, thereby increasing the transmittance of the visible light and increasing the resolution of the camera. However, since the camera hole 5 is formed by drilling a hole in the lower polarizer 21, the first substrate 23, the second substrate 25, and the upper polarizer 27, which constitute the liquid crystal panel 20, respectively by the laser, it is difficult to drill the hole in with a uniform size, the processing cost is increased, the structural rigidity is reduced, the thermal deformation due to the laser should be considered, etc. Therefore, the camera hole 5 passes through the backlight unit 10 and is formed up to the lower polarizer 21 in the liquid crystal panel 20.

The interference prevention hole 28 is for preventing the upper polarizer 27 from being positioned on the front surface of the camera lens. The first substrate 23 and the second substrate 25 do not affect the image of the camera 9, but the polarizers 21, 27 adjust the intensity of light by the polarization function, thereby affecting the image of the camera 9 when they are positioned on the front surface of the camera lens.

Therefore, the lower polarizer 21 forms the camera hole 5 to be communicated with the camera hole 5 of the backlight unit 10 so that the camera 9 can be inserted into the camera hole 5 of the lower polarizer 21, and the upper polarizer 27 forms the interference prevention hole 28 at a position corresponding to the camera hole 5 so that the polarizers 21, 27 are not positioned on the front surface of the camera 9.

The cover plate 30 is attached to the liquid crystal panel 20 by vacuum bonding. The cover plate 30 is attached to the upper polarizer 27 of the liquid crystal panel 20 through an adhesive film 40. The vacuum bonding is for preventing the generation of air bubbles between the lamination interfaces.

When the vacuum bonding is not applied at the time of attaching the cover plate 30 to the liquid crystal panel 20, a bubble bundle is generated between the lamination interfaces. However, a structure in which a closed hole like the interference prevention hole 28 is formed, the vacuum bonding can result in the bending of the liquid crystal panel due to a difference in air pressures after the vacuum is released, and can cause yellowing, stains, and appearance deformation, etc. due to the bending. The generation of bending, etc. of the liquid crystal panel caused by the vacuum bonding is solved by applying a deformation prevention structure, which will be described later. Wherein, the deformation prevention structure as follows are only examples, but not limited thereto.

The adhesive film 40 may apply the relatively smaller size as compared to that of the upper polarizer 27 in order not to be received into the interference prevention hole 28 upon the vacuum bonding of the cover plate 30 and the liquid crystal panel 20. In the case of a vacuum bonding apparatus having good performance, the size of the adhesive film 40 can also be applied so that the upper polarizer 27 and the adhesive film 40 correspond to each other at a ratio of 1:1, but when the upper polarizer 27 and the adhesive film 40 correspond to each other at a ratio of 1:1, the adhesive film 40 can be shifted to any one side or received into the interference prevention hole 28 upon the vacuum bonding, resulting in misalignment. The adhesive film 40 uses an optical clear adhesive film (OCA).

A micro-hole 50 for passing through the first substrate 23 and the second substrate 25 is formed therein. The micro-hole 50 functions as a deformation prevention structure for preventing the generation of air bubbles or the occurrence of bending in the camera hole 5 and the interference prevention hole 28 due to the camera hole 5 and the interference prevention hole 28. Specifically, the micro-hole 50 functions as an air path upon the vacuum bonding for attaching the cover plate 30 to the liquid crystal panel 20 by communicating the camera hole 5 and the interference prevention hole 28.

When the vacuum bonding for attaching the cover plate 30 to the liquid crystal panel 20 is performed without forming the micro-hole 50 for communicating the camera hole 5 and the interference prevention hole 28, the vacuum is applied to the interference prevention hole 28, such that there occur the bending phenomena that the end portions of the upper polarizer 27 and the lower polarizer 21 are bent upward in the portions of the interference prevention hole 28 and the camera hole 5 and the first substrate 23 and the second substrate 25 are bent upward. When the bending phenomenon of the liquid crystal panel 20 occurs in the camera hole 5, not only the appearance quality of the camera hole 5 is reduced but also the display distortion phenomenon of the camera 9 occurs due to the bending.

That is, upon the vacuum bonding, the air pressure of the interference prevention hole 28 becomes 0 standard atmosphere (atm) and the atmospheric pressure is 1 atm, such that the liquid crystal panel 20 is bent in the camera hole 5 due to a difference in two air pressures, thereby occurring the image distortion phenomenon of the camera when the camera 9 is installed in the camera hole 5. Therefore, the micro-hole 50 for communicating the interference prevention hole 28 and the camera hole 5 is formed in the first substrate 23 and the second substrate 25, thereby preventing the bending deformation of the portion of the liquid crystal panel 20 in the camera hole 5 upon the vacuum bonding.

The micro-hole 50 can be formed in at least one at a position corresponding to the edge of the camera hole 5 in the first substrate 23 and the second substrate 25. In an embodiment, the micro-hole 50 is formed in a pair at a position corresponding to the edge of the camera hole 5 in the first substrate 23 and the second substrate 25.

After the vacuum bonding, the micro-hole 50 is covered by coating glue 55 for preventing the inflow of foreign substances and preventing the light leakage. The micro-hole 50 is formed at a position corresponding to the edge of the camera hole 5 that is not interfered with the camera 9 so that the glue 55 for covering the micro-hole 50 does not affect the image quality of the camera 9. Specifically, the micro-hole 50 is present outside the angle of view of the camera and formed to not affect the characteristics of the liquid crystal panel 20.

The micro-hole 50 has the diameter of 20 micrometers (μm) to 50 μm. The diameter of the micro-hole 50 can be processed and is formed with the minimum diameter so that the air pressures between the interference prevention hole 28 and the outside are in equilibrium with each other by communicating the interference prevention hole 28 and the camera hole 5 upon the vacuum bonding while not affecting the image quality of the camera 9. When the air pressures between the interference prevention hole 28 and the outside are in equilibrium with each other, the portion of the liquid crystal panel 20 is not bent in the camera hole 5.

In addition, the micro-hole 50 functions for minimizing the generation of air bubbles between the lamination interfaces in the liquid crystal panel 20 by removing stress acting on the liquid crystal panel 20 upon the vacuum bonding.

A method for manufacturing the display device of the above-described embodiment will be described.

Figure 3A:
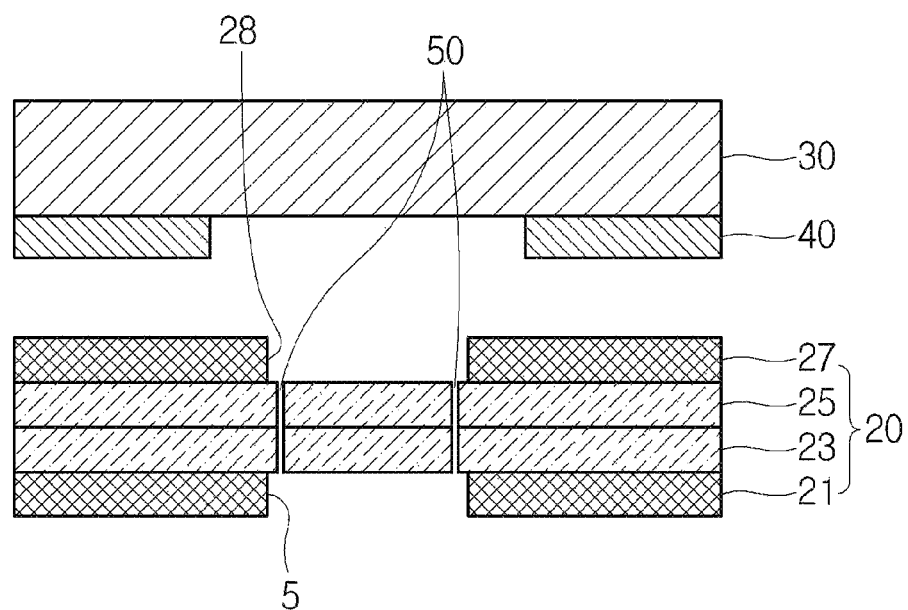
FIGS. 3A to 3C are diagrams illustrating a procedure of manufacturing FIG. 2, according to an embodiment.

As illustrated in FIG. 3A, the liquid crystal panel 20 is prepared in which the camera hole 5 is formed in the lower polarizer 21 and the interference prevention hole 28 is formed in the upper polarizer 27. The liquid crystal panel 20 forms the micro-hole 50 in the first substrate 23 and the second substrate 25 positioned between the lower polarizer 21 and the upper polarizer 27 so that the interference prevention hole 28 and the camera hole 5 are communicated with each other through the micro-hole 50.

The cover plate 30 is prepared by providing the adhesive film 40 at a position corresponding to the upper polarizer 27 on the back surface thereof. The adhesive film 40 has an OCA film, and has the relatively smaller size as compared to that of the upper polarizer 27 in order not to be received into the interference prevention hole 28 upon the vacuum bonding. In an embodiment, the adhesive film 40 is prepared to have the relatively shorter length as compared to that of the portion of the upper polarizer 27 in the interference prevention hole 28.

Next, the cover plate 30 is positioned on the upper portion of the liquid crystal panel 20 prepared in a vacuum chamber (VC) so that the upper polarizer 27 and the adhesive film 40 correspond to each other, and the cover plate 30 and the liquid crystal panel 20 are bonded by the vacuum pressing.

Figure 3B:
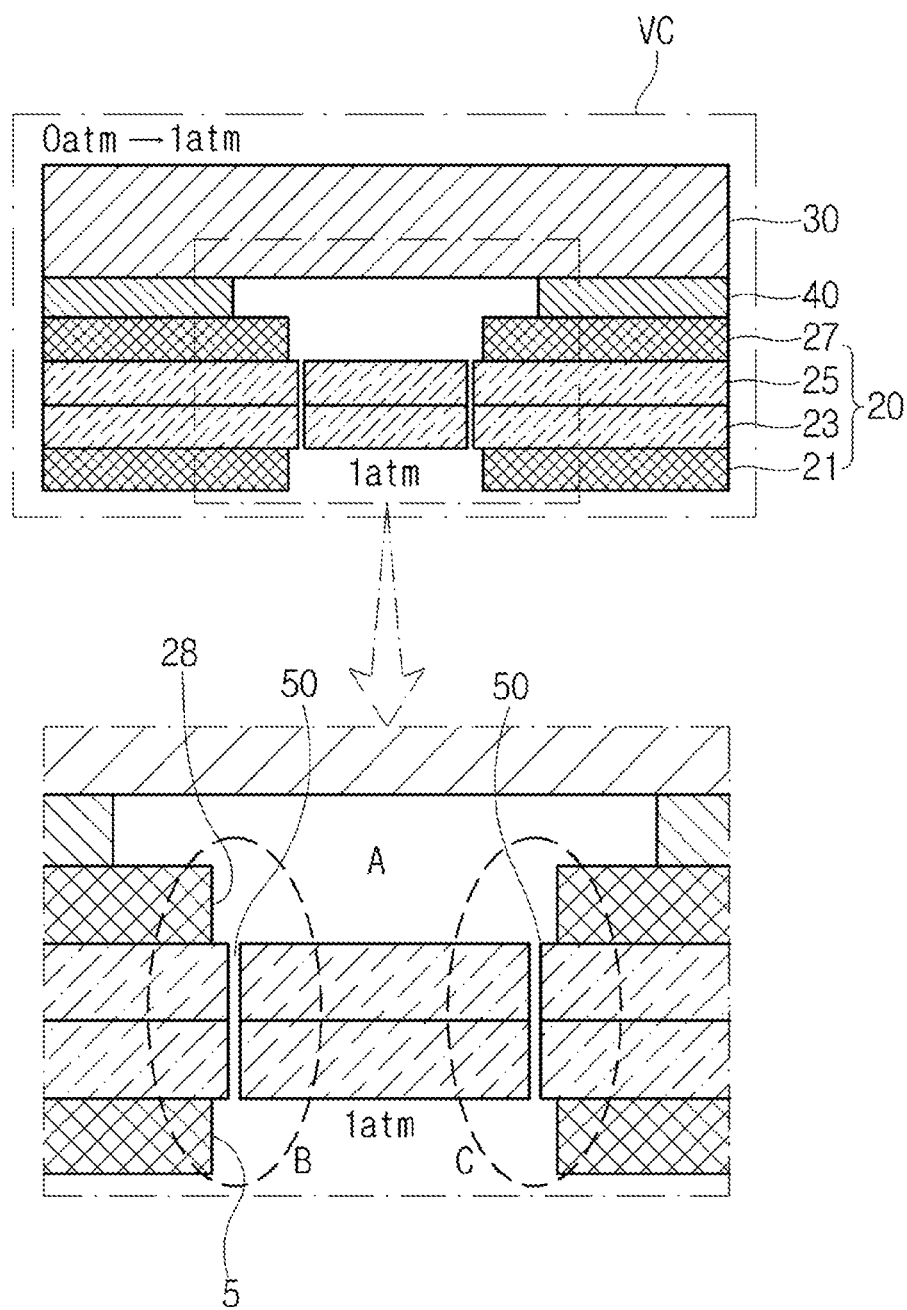

As illustrated in FIG. 3B, the cover plate 30 is positioned on the upper portion of the liquid crystal panel 20 and upon the vacuum pressing, the adhesive film 40 is fused and the cover plate 30 is bonded to the upper polarizer 27 of the liquid crystal panel 20 through the adhesive film 40 by the vacuum pressing.

Upon the vacuum bonding, the micro-hole 50 (parts B and C) functions as an air path for passing through the air by communicating the interference prevention hole 28 and the camera hole 5. Therefore, even when the vacuum is released after the vacuum bonding, the air pressures between the interference prevention hole 28 (part A) and the outside is in equilibrium with each other, thereby not occurring the bending of the portion of the liquid crystal panel 20 in the camera hole 5. The air pressure at the time of vacuum bonding is 0 atm, and when the vacuum is released, the air pressure becomes 1 atm.

Since the liquid crystal panel 20 is not bent, the flat liquid crystal panel 20 can be secured and the display defects such as the yellowing and the distortion of a light path can be prevented.

Figure 3C:
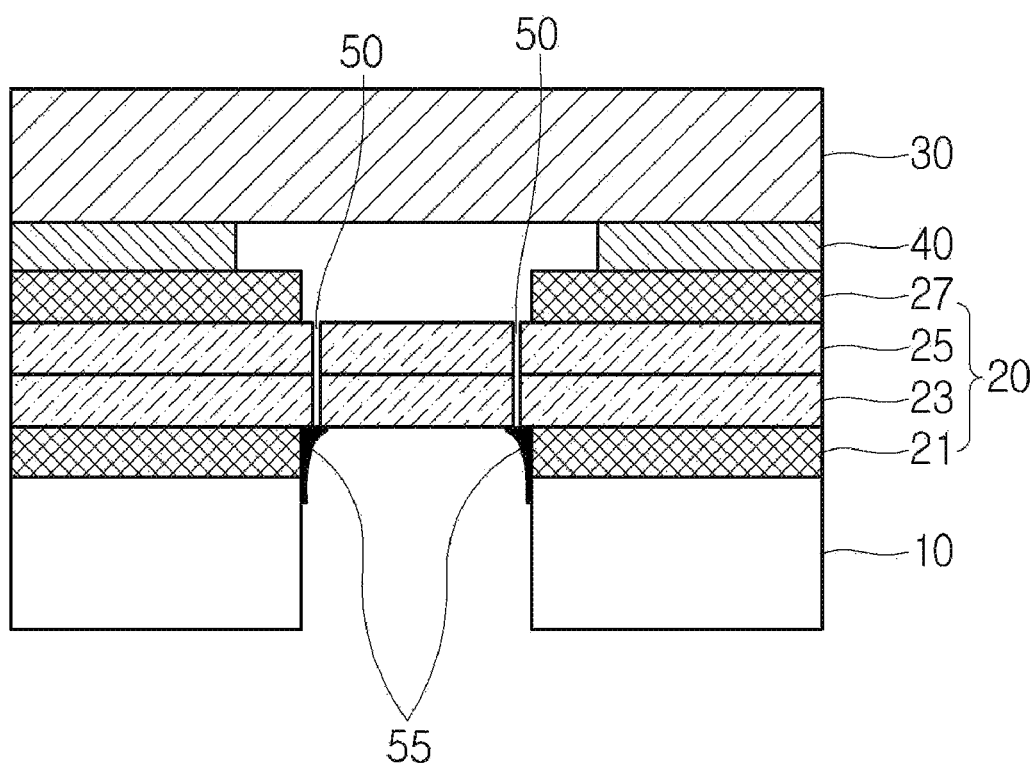

As illustrated in FIG. 3C, after the vacuum bonding, the backlight unit 10 is attached to the lower portion of the liquid crystal panel 20. Specifically, the backlight unit 10 formed with the camera hole 5 communicated with the camera hole 5 of the lower polarizer 21 is attached to the lower portion of the lower polarizer 21.

The micro-hole 50 can be covered by coating the glue 55, thereby preventing the inflow of the foreign substances and the light leakage through the camera hole 5 of the backlight unit 10.

In an embodiment, the camera hole 5 is formed in the lower polarizer 21 and the interference prevention hole 28 is formed in the upper polarizer 27 in the liquid crystal panel 20 so that the polarizers 21, 27 do not cover the camera lens, thereby increasing the resolution of the camera, and the vacuum bonding is applied when the cover plate 30 is attached to the liquid crystal panel 20, thereby preventing the generation of air bubbles between the lamination interfaces, and the micro-hole 50 is applied to the liquid crystal panel 20 as a deformation prevention structure, thereby preventing the occurrence of bending in the camera hole 5 and the interference prevention hole 28 due to the vacuum bonding.

In addition, the adhesive film 40 for attaching the lower polarizer 21 to the liquid crystal panel 20 has the smaller size as compared to that of the upper polarizer 27 so that the adhesive film 40 is not received into the interference prevention hole 28 upon the vacuum bonding, thereby preventing the adhesive film 40 from affecting the image quality of the camera.

Figure 4:
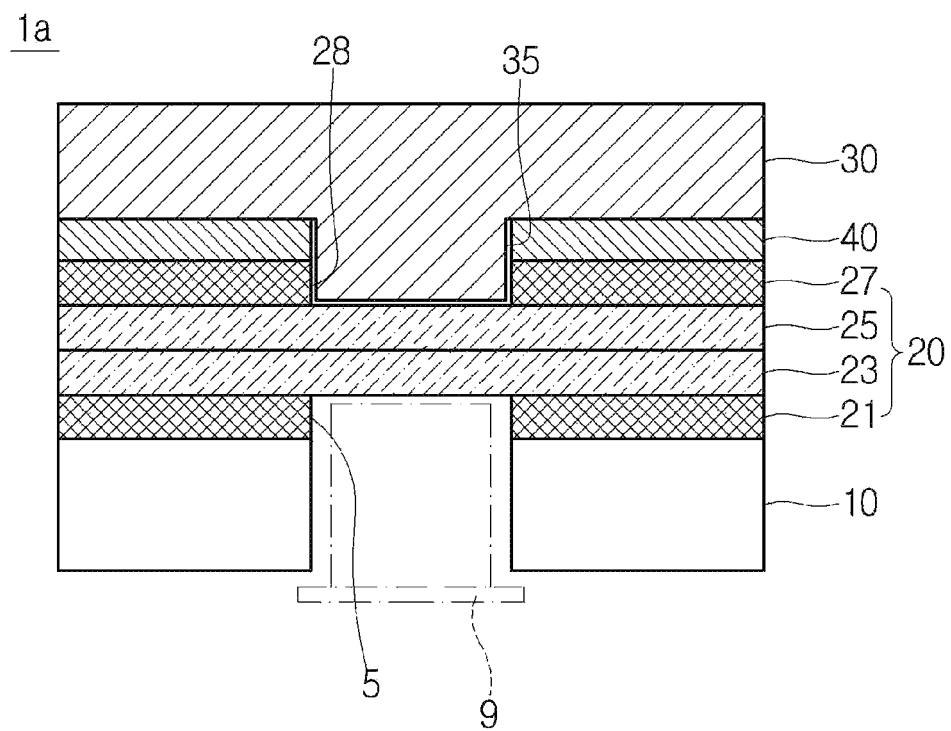
FIG. 4 is a cross-sectional diagram illustrating another embodiment of the portion A-A of FIG. 1.

In another embodiment, as illustrated in FIG. 4, a display device 1a includes the backlight unit 10, the liquid crystal panel 20 positioned on the upper portion of the backlight unit 10, the cover plate 30 attached to the upper portion of the liquid crystal panel 20, and a fixed protrusion 35 formed to be protruded from the back surface of the cover plate 30 and inserted into the interference prevention hole 28 upon the vacuum bonding.

In order to implement a hole-in-display type, the camera hole 5 is formed by passing through the backlight unit 10 and the lower polarizer 21. The camera 9 is inserted into the camera hole 5 formed by passing through the backlight unit 10 and the lower polarizer 21. The upper polarizer 27 is formed with the interference prevention hole 28 at a position corresponding to the camera hole 5.

The camera hole 5 is formed in the lower polarizer 21 and the interference prevention hole 28 is formed in the upper polarizer 27 in the liquid crystal panel 20 so that the polarizers 21, 27 do not cover the camera lens, thereby increasing the resolution of the camera.

The fixed protrusion 35 functions as a deformation prevention structure for preventing the generation of air bubbles or the occurrence of bending in the interference prevention hole 28 due to the interference prevention hole 28 formed in the upper polarizer 27.

When the interference prevention hole 28 is formed in the upper polarizer 27, a step is generated when the cover plate 30 is attached to the liquid crystal panel 20, and air bubbles are generated in the step portion, thereby causing the yellowing defect. In addition, the vacuum bonding is performed when the cover plate 30 is attached to the liquid crystal panel 20 in order to prevent the generation of air bubbles, and the stress received by the upper polarizer 27 is increased by the interference prevention hole 28 that is an empty space upon the vacuum bonding, thereby occurring the bending of the upper polarizer 27 and reducing the rigidity. Therefore, the fixed protrusion 35 of the cover plate 30 is inserted into the interference prevention hole 28 to fill the volume thereof and compensate for the step, thereby preventing the stress received by the upper polarizer 27 from increasing upon the vacuum bonding.

The fixed protrusion 35 is made of the same material as that of the cover plate 30. The fixed protrusion 35 is formed at the outer diameter corresponding to the interference prevention hole 28. The fixed protrusion 35 polishes the edge of the back surface of the cover plate 30 so that the protrusion having the outer diameter of the size corresponding to that of the outer diameter of the interference prevention hole 28 is formed at a position corresponding to the interference prevention hole 28.

The fixed protrusion 35 is made of the same material as that of the cover plate 30, thereby not affecting the image quality of the camera 9 even while compensating for the volume by filling the interference prevention hole 28. That is, the interference prevention hole 28 is filled with the same material as that of the cover plate 30, thereby not reducing the transmittance of the camera 9 and also preventing the display distortion phenomenon of the camera.

In addition, the fixed protrusion 35 fills the interference prevention hole 28, thereby not generating the air bubbles, not occurring the yellowing, and not reducing the mechanical rigidity due to the vacuum upon the vacuum bonding. That is, the fixed protrusion 35 fills the interference prevention hole 28 so that the vacuum is not generated in the interference prevention hole 28 upon the vacuum bonding, thereby preventing the air bubbles, the yellowing, and the reduction in the mechanical rigidity.

Upon the vacuum bonding, the cover plate 30 is attached to the upper polarizer 27 by the adhesive film 40. The adhesive film 40 is provided on the back surface of the cover plate 30, and attaches the cover plate 30 to the upper polarizer 27 upon the vacuum bonding. The adhesive film 40 is an OCA film, and is provided on a portion except for the fixed protrusion 35 in the cover plate 30 so that the cover plate 30 is bonded to the upper polarizer 27 when the cover plate 30 is attached to the liquid crystal panel 20.

A method for manufacturing a display device according to the other embodiment will be described.

Figure 5A:
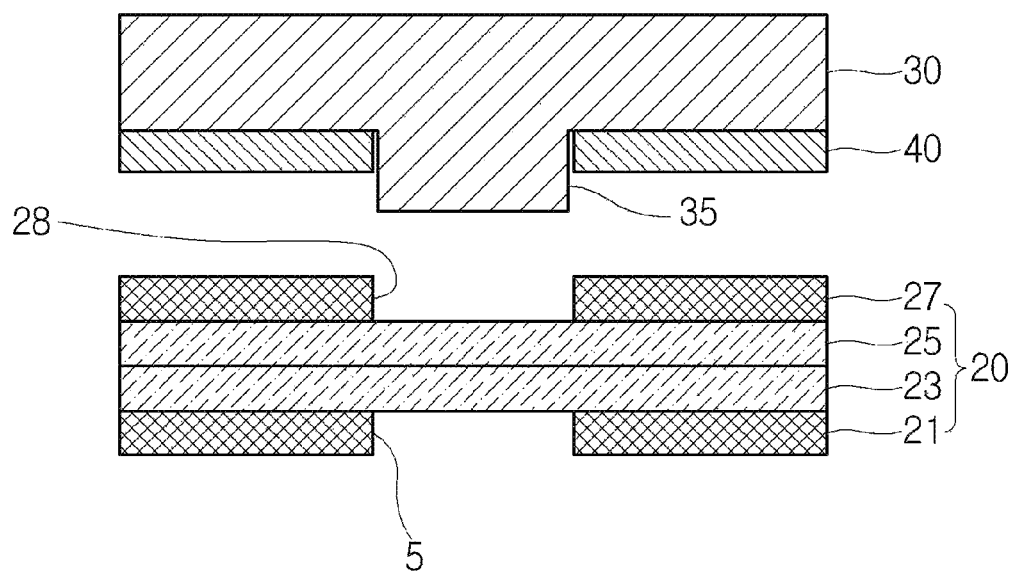
FIGS. 5A to 5C are diagrams illustrating a procedure of manufacturing FIG. 4, according to some embodiments.

As illustrated in FIG. 5A, the liquid crystal panel 20 is prepared in which the camera hole 5 is formed in the lower polarizer 21 and the interference prevention hole 28 communicated with the camera hole 5 is formed in the upper polarizer 27. The liquid crystal panel 20 includes the first substrate 23 and the second substrate 25 positioned between the lower polarizer 21 and the upper polarizer 27.

The cover plate 30 is prepared by polishing the back surface of the cover plate 30 so that the fixed protrusion 35 of the same material as that of the cover plate 30 is formed at a position corresponding to the interference prevention hole 28 of the upper polarizer 27. The fixed protrusion 35 has the outer diameter of the size corresponding to that of the outer diameter of the interference prevention hole 28. In addition, the fixed protrusion 35 is prepared by forming in the length capable of filling the interference prevention hole 28. In addition, the cover plate 30 has the adhesive film 40 corresponding to the upper polarizer 27 at a portion except for the fixed protrusion 35.

Next, the cover plate 30 is positioned on the prepared liquid crystal panel 20 so that the interference prevention hole 28 and the fixed protrusion 35 correspond to each other and the upper polarizer 27 and the adhesive film 40 correspond to each other, and the cover plate 30 and the liquid crystal panel 20 are bonded by the vacuum pressing.

Figure 5B:
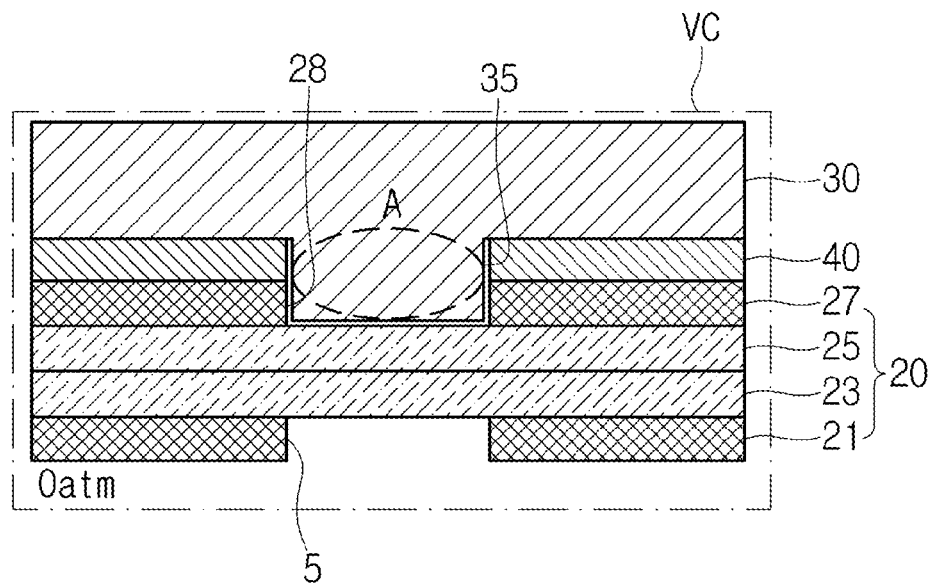

As illustrated in FIG. 5B, the cover plate 30 is positioned so that the fixed protrusion 35 is inserted into the interference prevention hole 28 of the liquid crystal panel 20 and upon the vacuum pressing, the adhesive film 40 is fused and the upper polarizer 27 of the liquid crystal panel 20 and the cover plate 30 are bonded.

Upon the vacuum bonding, the fixed protrusion 35 fills the volume (the portion A) of the interference prevention hole 28 to compensate for the step, thereby preventing the deformation of the liquid crystal panel 20 and not generating the air bubbles. The deformation of the liquid crystal panel 20 is prevented and the air bubbles are not generated, thereby preventing the display defects such as the yellowing, and the reduction in the mechanical rigidity and the distortion of a light path due to the deformation.

Figure 5C:
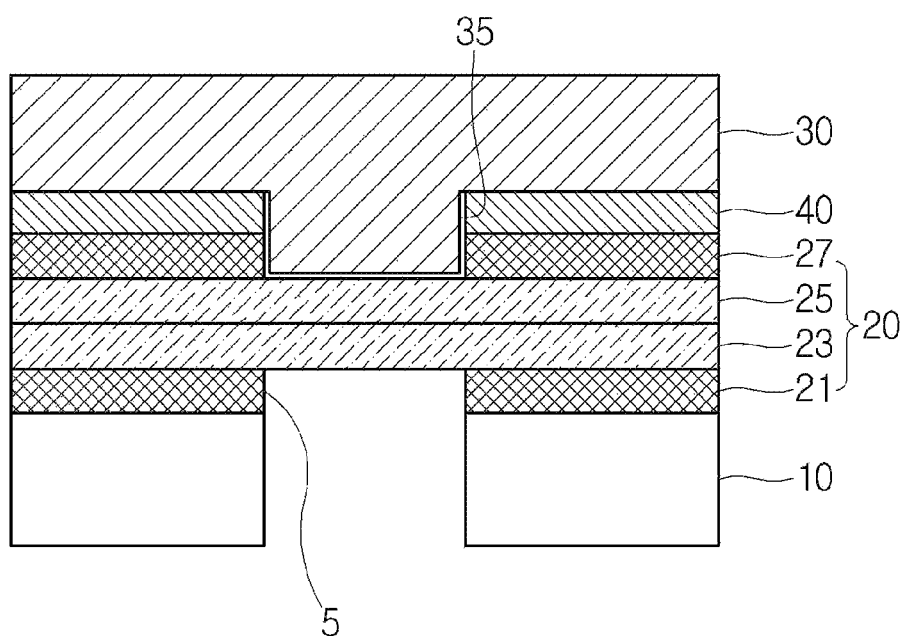

As illustrated in FIG. 5C, after the vacuum bonding, the backlight unit 10 is attached to the lower portion of the liquid crystal panel 20. Specifically, the backlight unit 10 formed with the camera hole 5 communicated with the camera hole 5 of the lower polarizer 21 is attached to the lower portion of the lower polarizer 21.

In the other embodiment, the camera hole 5 is formed in the lower polarizer 21 and the interference prevention hole 28 is formed in the upper polarizer 27 in the liquid crystal panel 20 so that the polarizers 21, 27 do not cover the camera lens, thereby increasing the resolution of the camera, the vacuum bonding is applied when the cover plate 30 is attached to the liquid crystal panel 20, thereby preventing the generation of the air bubbles between the lamination interfaces, and the fixed protrusion 35 is applied to the cover plate 30 as a deformation prevention structure for filling the volume of the interference prevention hole 28, thereby preventing the occurrence of the yellowing, the air bubbles, and the bending deformation in the interference prevention hole 28 due to the vacuum bonding.

In addition, the fixed protrusion 35 provided in the cover plate 30 and for filling the interference prevention hole 28 is made of the same material as that of the cover plate 30 and does not affect the image quality of the camera. This is because the fixed protrusion 35 can be formed by polishing the cover plate 30 without having to provide an additional material for compensating for the step caused by forming the interference prevention hole 28, thereby simplifying the process and reducing the cost due to no additional cost.

In addition, the first substrate 23 and the second substrate 25 have been covered by the fixed protrusion 35, thereby preventing the occurrence of light leakage through the camera hole 5.

Figure 6:
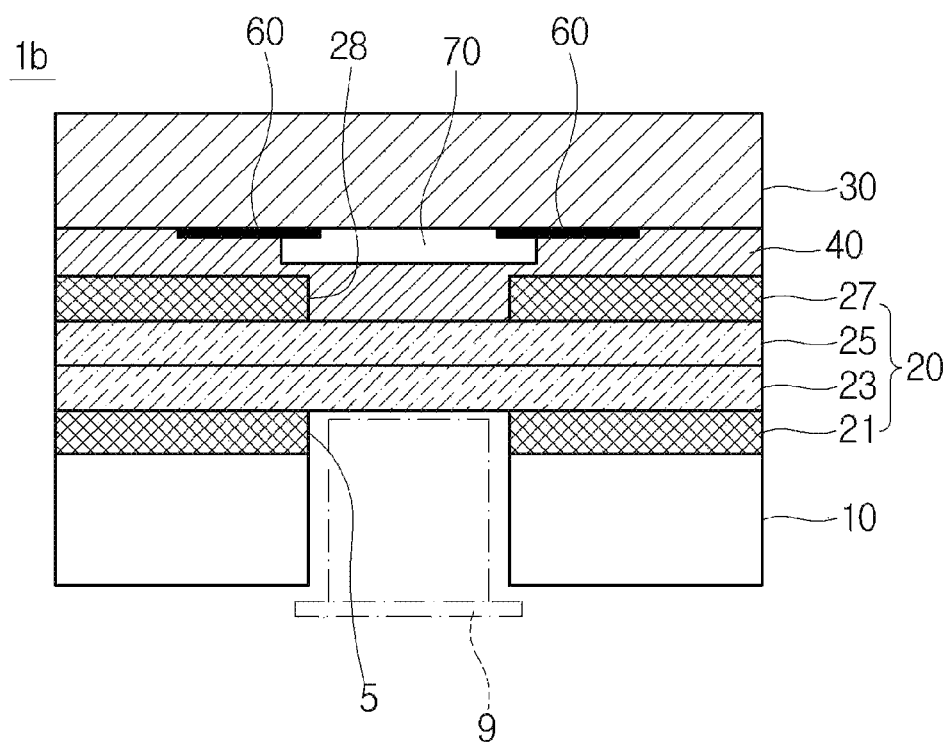
FIG. 6 is a cross-sectional diagram illustrating still another embodiment of the portion A-A of FIG. 1.

In still another embodiment, as illustrated in FIG. 6, a display device 1b includes the backlight unit 10, the liquid crystal panel 20 positioned on the upper portion of the backlight unit 10, and a transparent ink layer 70 provided on the cover plate 30 and for compensating for the volume of the interference prevention hole 28 upon the vacuum bonding for attaching the cover plate 30 to the upper polarizer 27.

In order to implement a hole-in-display type, the camera hole 5 is formed by passing through the backlight unit 10 and the lower polarizer 21. The camera 9 is inserted into the camera hole 5 formed by passing through the backlight unit 10 and the lower polarizer 21. The upper polarizer 27 is formed with the interference prevention hole 28 at a position corresponding to the camera hole 5.

The camera hole 5 is formed in the lower polarizer 21 and the interference prevention hole 28 is formed in the upper polarizer 27 in the liquid crystal panel 20 so that the polarizers 21, 27 do not cover the camera lens, thereby increasing the resolution of the camera.

The transparent ink layer 70 functions as a deformation prevention structure for preventing the generation of air bubbles or the occurrence of bending in the interference prevention hole 28 due to the interference prevention hole 28 formed in the upper polarizer 27.

When the interference prevention hole 28 is formed in the upper polarizer 27 and the cover plate 30 is attached to the upper polarizer 27 of the liquid crystal panel 20 by the adhesive film 40, the adhesive film 40 positioned in the interference prevention hole 28 is not sufficiently in close contact with the upper polarizer 27 or the cover plate 30, thereby generating the air bubbles.

This is because the interference prevention hole 28 is an empty space, such that the volume thereof is larger than those of other regions and it is difficult to fill a large volume relative to the thickness thereof due to the characteristics of the adhesive film 40, thereby inevitably generating the air bubbles even by the vacuum bonding. For reference, when the flat surfaces having no interference prevention hole are bonded to each other, the air bubbles are not generated even when the adhesive film is used and the vacuum bonding is performed.

Although a deforming process time can also be lengthened in order to remove the air bubbles when the cover plate 30 is attached to the liquid crystal panel 20 having the interference prevention hole 28 by the adhesive film 40, the problems such as the reliability and the display abnormal of the liquid crystal panel can be generated. Alternatively, although the thickness of the adhesive film 40 can be increased to increase the air-bubble prevention allowance, the overall thickness of the cover plate 30 portion is increased, thereby reducing the merchantability.

Therefore, still the other embodiment of the present disclosure includes the transparent ink layer 70 in the cover plate 30 so that the transparent ink layer 70 compensates for the volume of the interference prevention hole 28 upon the vacuum bonding for attaching the cover plate 30 to the upper polarizer 27 by using the adhesive film 40.

The transparent ink layer 70 is filled in close contact with the portion where the adhesive film 40 is sagged into the interference prevention hole 28 in the region corresponding to the interference prevention hole 28, thereby compensating the volume of the interference prevention hole 28. The volumetric compensation of the interference prevention hole 28 using the transparent ink layer 70 prevents the generation of the air bubbles and also prevents an increase in the overall thickness of the cover plate 30 portion.

The transparent ink layer 70 is provided on the back surface of the cover plate 30 corresponding to the interference prevention hole 28. The volume of the transparent ink layer 70 corresponds to the volume of the interference prevention hole 28 in order to compensate for the volume of the interference prevention hole 28. The transparent ink layer 70 is designed to have the volume that compensates for the volume (height, area) of the interference prevention hole 28.

The transparent ink layer 70 can be made of a transparent ink having the small reflectance in order not to affect the image quality of the camera. In addition, the transparent ink layer 70 has the viscosity and compensates for the volume of the interference prevention hole 28 in such a manner as to fill the space of the portion where the adhesive film 40 is sagged into the portion corresponding to the interference prevention hole 28 upon the vacuum bonding. Since the transparent ink layer 70 uses a transparent ink of a resin form, it has more fluidity than a film form, such that it is easy to compensate for the volume of the interference prevention hole and it is effective to prevent the generation of air bubbles upon the vacuum bonding.

Although not illustrated, in another example, the adhesive film 40 may not be provided in the portion corresponding to the interference prevention hole 28. In this case, the volume of the transparent ink layer 70 is designed to have the volume capable of compensating for the volume of the interference prevention hole 28 and the volume of the adhesive film 40 that is empty at a position corresponding to the interference prevention hole 28. In this case, the transparent ink layer 70 fills the volume of the interference prevention hole 28 corresponding to the camera hole 5 and the adhesive film is not positioned in the interference prevention hole 28, thereby improving the image quality of the camera 9.

A black ink layer 60 is included on the back surface of the cover plate 30 corresponding to the edge of the camera hole 5. The black ink layer 60 is included on the back surface of the cover plate 30 for compensating for the step of the interference prevention hole 28 and preventing the light leakage. The black ink layer 60 is included at a position corresponding to the edge of the camera hole 5 in the cover plate 30 in order to prevent the light leakage of the camera hole without interfering with the camera.

Specifically, the cover plate 30 has the black ink layer 60 coated or printed on the back surface thereof, and the transparent ink layer 70 is coated or printed on the black ink layer 60 in order to cover at least a part of the black ink layer 60. The black ink layer 60 can be formed by coating or printing two or more layers of the black inks on the back surface of the cover plate 30 for compensating for the step.

A method for manufacturing a display device according to still the other embodiment will be described.

Figure 7A:
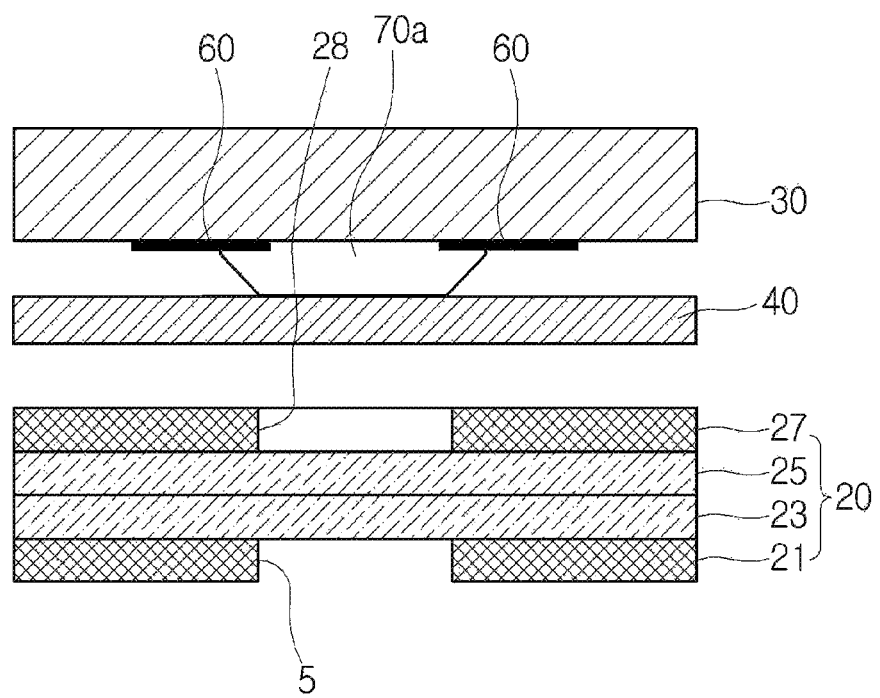
FIGS. 7A to 7C are diagrams illustrating a procedure of manufacturing FIG. 6, according to some embodiments.

As illustrated in FIG. 7A, the liquid crystal panel 20 is prepared in which the camera hole 5 is formed in the lower polarizer 21 and the interference prevention hole 28 communicated with the camera hole 5 is formed in the upper polarizer 27. The liquid crystal panel 20 includes the first substrate 23 and the second substrate 25 positioned between the lower polarizer 21 and the upper polarizer 27.

The cover plate 30 is prepared by forming the black ink layer 60 by coating or printing black ink at a position corresponding to the edge of the interference prevention hole 28 of the upper polarizer 27, and coating or printing a transparent ink 70a at a position corresponding to the interference prevention hole 28 in order to cover at least a part of the black ink layer 60. In addition, the cover plate 30 has the adhesive film 40 for attaching with the liquid crystal panel 20. The adhesive film 40 can be an OCA film or an OCR film. The OCA film is a transparent adhesive film and the OCR film is a transparent adhesive liquid.

For reference, FIG. 7A has illustrated the size of the transparent ink 70a in an exaggerated manner. Then, the transparent ink 70a is the same as the transparent ink layer 70 for compensating for the volume of the interference prevention hole 28 upon the vacuum bonding and has been separately illustrated for convenience of understanding.

Next, the cover plate 30 is positioned on the upper portion of the prepared liquid crystal panel 20 so that the portions of the interference prevention hole 28 and the transparent ink 70a corresponds to each other and the cover plate 30 and the liquid crystal panel 20 are bonded by the vacuum pressing.

Figure 7B:
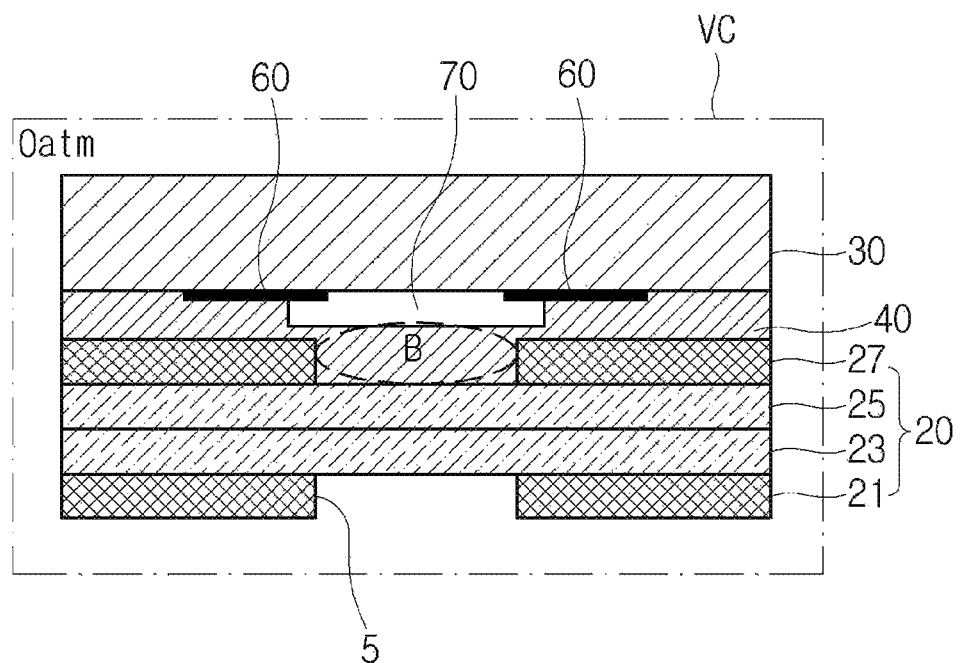

As illustrated in FIG. 7B, when the cover plate 30 is positioned so that the transparent ink 70a portion corresponds to the interference prevention hole 28 of the liquid crystal panel 20 to be vacuum-bonded, the transparent ink layer 70 compensates for the volume of the interference prevention hole 28 in a manner of filling the upper space thereof while closely contacting the adhesive film 40 into the interference prevention hole 28 (the portion B) and the upper polarizer 27 of the liquid crystal panel 20 and the cover plate 30 are bonded by the adhesive film 40.

Upon the vacuum bonding, the transparent ink layer 70 compensates for the volume of the interference prevention hole 28 to compensate for the step, thereby preventing the deformation of the liquid crystal panel 20 and not generating the air bubbles in the interference prevention hole 28. The deformation of the liquid crystal panel 20 is prevented and the air bubbles are not generated, thereby preventing the display defects such as the yellowing, and the reduction in the mechanical rigidity and the distortion of a light path due to the deformation.

Figure 7C:
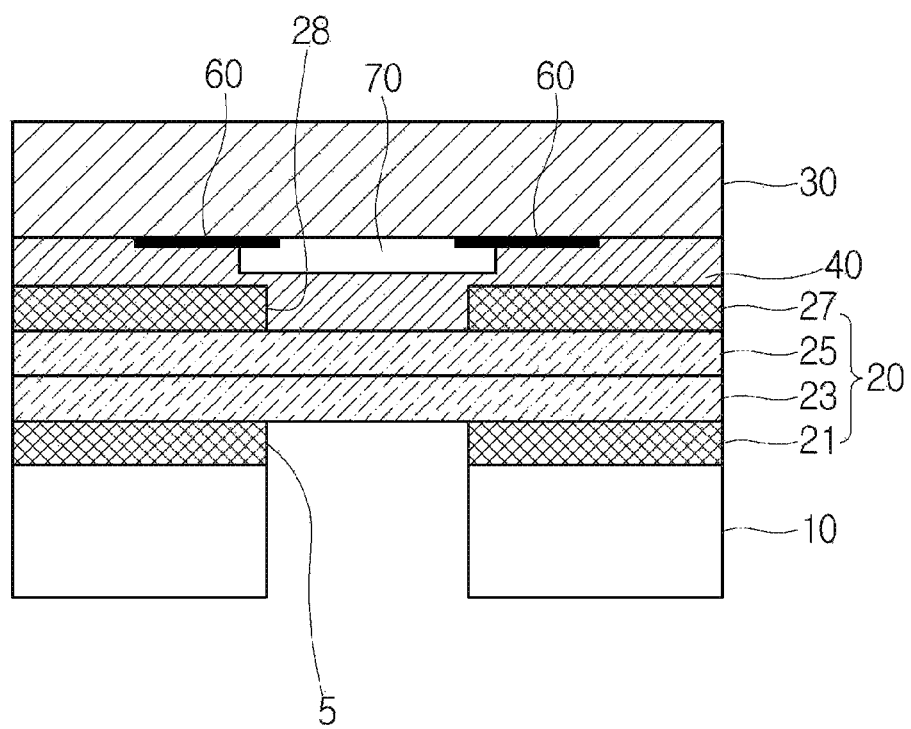

As illustrated in FIG. 7C, after the vacuum bonding, the backlight unit 10 is attached to the lower portion of the liquid crystal panel 20. Specifically, the backlight unit 10 formed with the camera hole 5 communicated with the camera hole 5 of the lower polarizer 21 is attached to the lower portion of the lower polarizer 21.

In still the other embodiment, the camera hole 5 is formed in the lower polarizer 21 and the interference prevention hole 28 is formed in the upper polarizer 27 in the liquid crystal panel 20 so that the polarizers 21, 27 do not cover the camera lens, thereby increasing the resolution of the camera. In addition, the vacuum bonding is applied when the cover plate 30 is attached to the liquid crystal panel 20, thereby preventing the generation of air bubbles between the lamination interfaces. In addition, the transparent ink layer 70 is applied to the cover plate 30 as a deformation prevention structure for compensating for the volume of the interference prevention hole 28, thereby preventing the occurrence of the yellowing, the air bubbles, and the bending deformation in the interference prevention hole 28 due to the vacuum bonding.

In addition, the transparent ink layer 70 provided on the cover plate 30 and for compensating for the volume of the interference prevention hole 28 is a transparent material having the small reflectance, thereby not affecting the image quality of the camera.

In addition, the transparent ink layer 70 is formed by coating or printing a transparent ink on the cover plate 30 and has the viscosity to compensate for the volume of the interference prevention hole 28 and compensate for the step upon the vacuum bonding, thereby simplifying the process and reducing the cost due to no additional cost.

In addition, the black ink layer 60 can be included on the cover plate 30, thereby preventing the light-leakage and compensating for the step.

Hereinafter, an operation of the present disclosure will be described.

The present disclosure forms the camera hole 5 in the lower polarizer 21 and forms the interference prevention hole 28 in the upper polarizer 27 in the liquid crystal panel 20 so that the polarizers 21, 27 do not cover the camera lens, thereby increasing the resolution of the camera, and applies the vacuum bonding when the cover plate 30 is attached to the liquid crystal panel 20, thereby preventing the generation of air bubbles between the lamination interfaces.

In addition, the present disclosure applies the micro-hole 50 to the liquid crystal panel 20, thereby preventing the generation of air bubbles, the occurrence of bending, etc. in the camera hole 5 and the interference prevention hole 28 due to the vacuum bonding.

The micro-hole 50 functions as an air path upon the vacuum bonding for attaching the cover plate 30 to the liquid crystal panel 20 by communicating the camera hole 5 and the interference prevention hole 28 so that the air pressures between the interference prevention hole 28 and the outside are in equilibrium with each other, thereby preventing the generation of air bubbles and the occurrence of bending of the liquid crystal panel 20 in the camera hole 5 and the interference prevention hole 28.

In addition, the adhesive film 40 for attaching the lower polarizer 21 to the liquid crystal panel 20 has the smaller size as compared to that of the upper polarizer 27 so that the adhesive film 40 is not received into the interference prevention hole 28 upon the vacuum bonding, thereby preventing the adhesive film 40 from affecting the image quality of the camera.

Alternatively, the present disclosure applies the fixed protrusion 35 for filling the volume of the interference prevention hole 28 to the cover plate 30, thereby preventing the occurrence of the yellowing, the air bubbles, and the bending deformation in the interference prevention hole 28 due to the vacuum bonding.

The fixed protrusion 35 is made of the same material as that of the cover plate 30 by polishing the back surface of the cover plate 30, thereby not affecting the image quality of the camera 9 even while filling the volume of the interference prevention hole 28.

Alternatively, the present disclosure applies the transparent ink layer 70 for compensating for the volume of the interference prevention hole 28 to the cover plate 30, thereby preventing the occurrence of yellowing in the interference prevention hole 28 due to the vacuum bonding, the generation of air bubbles and the occurrence of bending deformation due to the stretch of the adhesive film in the interference prevention hole 28, etc.

The transparent ink layer 70 is designed to have the volume capable of compensating for the volume of the interference prevention hole 28 and is formed in the method of coating or printing a transparent ink on the cover plate 30, thereby securing the mass productivity and securing the appearance quality. In addition, the transparent ink layer 70 is made of a transparent material and is formed with the transparent ink having the small reflectance, thereby not affecting the image quality of the camera.

The above-described present disclosure is applicable in combination of some or all of the embodiment, the other embodiment, and still the other embodiment.

In addition, the display device of the present disclosure is applicable not only to a mobile display but also to an LCD TV, a navigation system, a DMB, a monitor, etc.

The present disclosure forms the camera hole in the lower polarizer and forms the interference prevention hole in the upper polarizer in the liquid crystal panel so that the polarizers do not cover the camera lens, thereby increasing the resolution of the camera, and applies the vacuum bonding when the cover plate is attached to the liquid crystal panel, thereby preventing the generation of air bubbles between the lamination interfaces.

In addition, the present disclosure applies the micro-hole for communicating the interference prevention hole and the camera hole in the liquid crystal panel, thereby preventing the generation of air bubbles, the occurrence of bending, etc. in the interference prevention hole and the camera hole due to the vacuum bonding, applies the fixed protrusion of the same material as that of the cover plate for filling the volume of the interference prevention hole to the cover plate, thereby preventing the occurrence of the yellowing, the air bubbles, and the bending deformation in the interference prevention hole due to the vacuum bonding, or applies the transparent ink layer for compensating for the volume of the interference prevention hole to the cover plate, thereby preventing the occurrence of the yellowing, the air bubbles, and the bending deformation in the interference prevention hole due to the vacuum bonding.

Therefore, the present disclosure forms the hole in the polarizer, thereby preventing the defects such as the generation of air bubbles, the bending deformation, and the distortion of a light path due to the formation of the hole and the vacuum bonding even while increasing the visible light transmittance and increasing the resolution of the camera, and improving the appearance quality of the display device.

The present disclosure has disclosed the best modes in the drawings and the specification. Although specific terms have been used herein, they are only used for the purpose of describing the present disclosure and are not used to limit the meaning or restrict the scope of the present disclosure described in the claims. Therefore, it will be understood by those skilled in the art that various modifications and other embodiments equivalent thereto can be made therefrom. Therefore, the true technical scope of the present disclosure should be determined by the technical spirit of the appended claims.

What is claimed is:

1. A display device, comprising:
a backlight unit;
a liquid crystal panel comprising a lower polarizer positioned on an upper surface of the backlight unit, an upper polarizer positioned on an upper surface of the lower polarizer, and a first substrate and a second substrate positioned between the lower polarizer and the upper polarizer;
a micro-hole passing through the first substrate and the second substrate;
a glue covering the micro-hole; and
a cover plate on an upper surface of the liquid crystal panel,
wherein a camera hole passes through the backlight unit and up to the lower polarizer, an interference prevention hole is located at a position corresponding to the camera hole in the upper polarizer, and the camera hole is not in the first substrate and the second substrate.

2. The display device of claim 1, wherein the micro-hole is located at least one position corresponding to an edge of the camera hole.

3. The display device of claim 1, wherein the micro-hole is 20 to 50 µm in diameter.

4. The display device of claim 1, further comprising an adhesive film between the cover plate and the upper polarizer.

5. The display device of claim 4, wherein a size of the adhesive film is smaller than that of the upper polarizer.

6. A display device comprising:
a backlight unit;
a liquid crystal panel comprising a lower polarizer positioned on an upper surface of the backlight unit, an upper polarizer positioned on an upper surface of the lower polarizer, and a first substrate and a second substrate positioned between the lower polarizer and the upper polarizer;
a cover plate on an upper surface of the liquid crystal panel;
wherein a camera hole passes through the backlight unit and up to the lower polarizer, an interference prevention hole is located at a position corresponding to the camera hole in the upper polarizer, and the camera hole is not in the first substrate and the second substrate,
wherein a fixed protrusion protrudes from a lower surface of the cover plate and is inserted into the interference prevention hole.

7. The display device of claim 6, wherein the fixed protrusion is made of the same material as that of the cover plate.

8. The display device of claim 6, wherein an outer diameter of the fixed protrusion corresponds to that of the interference prevention hole.

9. The display device of claim 6, further comprising an adhesive film between the cover plate and the upper polarizer, wherein the adhesive film is provided on a portion except for the fixed protrusion in the cover plate.

10. A display device comprising:
a backlight unit;
a liquid crystal panel comprising a lower polarizer positioned on an upper surface of the backlight unit, an upper polarizer positioned on an upper surface of the lower polarizer, and a first substrate and a second substrate positioned between the lower polarizer and the upper polarizer;
a cover plate on an upper surface of the liquid crystal panel; and
an adhesive film between the cover plate and the upper polarizer,
wherein a camera hole passes through the backlight unit and up to the lower polarizer, an interference prevention hole is located at a position corresponding to the camera hole in the upper polarizer, and the camera hole is not in the first substrate and the second substrate,
wherein a transparent ink layer is disposed corresponding to the interference prevention hole on a lower surface of the cover plate,
wherein the adhesive film is sagged into the interference prevention hole and a volume of the transparent ink layer corresponds to the volume of the interference prevention hole.

11. The display device of claim 10, wherein a black ink layer is located on the lower surface of the cover plate at a position corresponding to an edge of the camera hole.

12. The display device of claim 11, wherein the transparent ink layer is located on the black ink layer.

\* \* \* \* \*